(12) United States Patent
Huggins et al.

(10) Patent No.: US 7,273,197 B1
(45) Date of Patent: Sep. 25, 2007

(54) ADJUSTABLE SHOPPING CART AND BABY STROLLER STAND

(76) Inventors: Kenwyn Huggins, 665 New York Ave., apt. 5G, Brooklyn, NY (US) 11203; Karen Huggins, 665 Bew York Ave., apt. 5G, Brooklyn, NY (US) 11203

( * ) Notice: Subject to any disclaimer, the term of this patent is extended or adjusted under 35 U.S.C. 154(b) by 199 days.

(21) Appl. No.: 10/909,774

(22) Filed: Aug. 2, 2004

(51) Int. Cl.
*A47G 23/02* (2006.01)
(52) U.S. Cl. .............. 248/154; 248/127; 248/146; 248/346.07; 248/346.06; 248/346.04; 248/346.03; 248/346.01; 188/19; 188/22; 188/35; 188/36; 211/24; 280/647
(58) Field of Classification Search ............... 248/154, 248/346.07, 346.06, 346.04, 346.03, 346.01; 248/127, 146; 211/24; 188/19, 22, 35, 36; 280/647
See application file for complete search history.

(56) References Cited

U.S. PATENT DOCUMENTS

| 653,048 | A | 7/1900 | Wigg | 211/24 |
|---|---|---|---|---|
| 719,615 | A | 2/1903 | Schulze | 211/24 |
| 1,284,260 | A | 11/1918 | Doering | 211/24 |
| 1,569,737 | A | 1/1926 | Fording | 211/24 |
| 3,391,760 | A | 7/1968 | Gonser | 188/32 |
| 3,811,536 | A | 5/1974 | Haynes | 188/4 R |
| 4,191,391 | A | 3/1980 | Dorlini | 280/9 |
| 4,856,659 | A | 8/1989 | Krebs | 211/24 |
| 5,036,986 | A | 8/1991 | Kral | 211/22 |
| 5,749,475 | A | 5/1998 | Krebs | 211/24 |
| 6,059,245 | A | * 5/2000 | Hermansen et al. | 248/311.2 |
| 6,062,396 | A | * 5/2000 | Eason | 211/20 |
| 6,290,029 | B1 | * 9/2001 | Gubler et al. | 188/36 |
| 6,386,331 | B2 | 5/2002 | Scheffer | 188/32 |
| 6,581,785 | B1 | * 6/2003 | Falkenstein | 211/24 |
| 6,637,840 | B2 | * 10/2003 | Zaleski et al. | 305/193 |
| 7,000,737 | B2 | * 2/2006 | Scheffer | 188/19 |
| 7,036,637 | B1 | * 5/2006 | Wiens | 188/36 |

* cited by examiner

*Primary Examiner*—Carl D. Friedman
*Assistant Examiner*—Todd M. Epps
(74) *Attorney, Agent, or Firm*—Michael I. Kroll (57) ABSTRACT

An apparatus for a storage stand for a shopping cart 12 and baby stroller 13 which will keep the shopping cart or baby stroller erect and immobile with a pair of adjustable spring-hinged arms 19 having bungee cords 20 positioned on the outside to keep the cart in the folded position. The apparatus 10 also has a locking pin 40 that can slide vertically to lock the clamps 19 in an upright position. One distal end of the front arm or clamp 19 comprises a loop member 32 where the bungee cord 20 passes through to the second arm or clamp having a ring 30 positioned at its distal end for connecting the bungee cord hooks thereto. The base 14 forming the housing is comprised of slidably engaging members at 22, one forming a shell for the other to selectively slide into and out at the user's discretion. Each of the sliding members has a cavity forming a wheel well 16.

8 Claims, 12 Drawing Sheets

ADJUSTABLE SHOPPING CART AND BABY STROLLER STAND

BACKGROUND OF THE INVENTION

1. Field of the Invention

The present invention relates generally to wheeled article stands and, more specifically, to a storage stand for a shopping cart and baby strollers, which will keep the shopping cart or baby stroller erect and immobile with a pair of adjustable spring hinged arms having bungee cords positioned on the outside to keep the cart in the folded position. The present invention also has a locking lever that can slide vertically to lock the clamps in an upright position. One distal end of the front arm or clamp comprises a loop member where the bungee cord passes through to the second arm or clamp having a ring positioned at its distal end for connecting the bungee cord hooks thereto.

Furthermore, the base forming the housing is comprised of slidably engaging members, one forming a shell for the other to selectively slide into and out at the user's discretion. Each of the sliding members has a cavity forming a wheel well. Adjustment of the distance between the wheel wells provides for various sized shopping carts and baby strollers.

Additionally, the present invention provides locking means for the clamping members in the raised position. A spring tensioned pin resides within a housing located at the base of each clamp. When the clamp arm is raised to an upright position, the pin is depressed until situated within the base receptacle and the clamping arm is released. The pressure of the clamping arm spring will overcome the pin spring pressure keeping the pin in the base receptacle while the stroller or cart is placed between the clamp arms. Once the article is selectively situated between the arms, slight exteriorly directed pressure applied to the arm tip will relieve the clamp spring pressure causing the pin spring to retract the pin. Upon release of the clamp arms pressure will be applied to the opposing sides of the contained article by the clamp arm springs.

2. Description of the Prior Art

There are other stand-like devices designed for holding articles having wheels. Typical of these is U.S. Pat. No. 653,048 issued to Wigg on Jul. 3, 1900.

Another patent was issued to Schulze on Feb. 3, 1903 as U.S. Pat. No. 719,615. Yet another U.S. Pat. No. 1,284,260 was issued to Doering, et al. on Nov. 12, 1918 and still yet another was issued on Jan. 12, 1926 to Fording as U.S. Pat. No. 1,569,737.

Another patent was issued to Gonser on Jul. 9, 1968 as U.S. Pat. No. 3,391,760. Yet another U.S. Pat. No. 3,811,536 was issued to Haynes on May 21, 1974. Another was issued to Dorlini on Mar. 4, 1980 as U.S. Pat. No. 4,191,391 and still yet another was issued on Aug. 15, 1989 to Krebs as U.S. Pat. No. 4,856,659.

Another patent was issued to Kral on Aug. 6, 1991 as U.S. Pat. No. 5,036,986. Yet another U.S. Pat. No. 5,749,475 was issued to Krebs on May 12, 1998. Another was issued to Scheffer on May 14, 2002 as U.S. Pat. No. 6,386,331. Another patent was issued to Falkenstein on Jun. 24, 2003 as U.S. Pat. No. 6,581,785. Another was issued to Paulus on Jun. 1, 1955 as U.K. Patent No. GB810,593 and still yet another was issued on Jan. 3, 1995 to Lister as U.K. Patent No. GB2,281,277.

U.S. Pat. No. 653,048

Inventor: Curtis Wigg

Issued: Jul. 3, 1900

Shown is a support for a rubber-tired vehicle wheel, the same being provided with a groove, an inclined approach to the central part thereof from the level of the roadway, and supports on which the flanges of the rim rest, and the weight of the wheel and vehicle is sustained, for the purpose set forth.

U.S. Pat. No. 719,615

Inventor: Wilhelm Schulze

Issued: Feb. 3, 1903

A support for rubber-tired wheels comprising two curved blocks one of which is provided with a transverse slot and a plate on its outer face projecting slightly into said slot, a toothed plate pivoted to the other block passing through the slot and normally spring pressed into engagement with said plate, a pin at the outer end of the blade to prevent the entire separation of the blocks, and springs mounted in sockets in the inner faces of the blocks, normally pressing the blocks apart substantially as described.

U.S. Pat. No. 1,284,260

Inventor: William M. Doering, et al.

Issued: Nov. 12, 1918

Shown is a knock-down stand, assuming the frustum of a pyramid, said structure comprising a rectangular shell open at the top and bottom, having flexible corners enabling the structure to be folded upon itself diagonally into flat form and to open up into stand formation, the end walls comprising pivotally connected sections, the upper margins being shaped to support a tire.

U.S. Pat. No. 1,569,737

Inventor: William G. Fording

Issued: Jan. 17, 1922

A support for a circular article comprising an elongated: receptacle adapted to receive a peripheral portion of said, article, said receptacle having flexible side and end walls and means carried by the side walls and adapted to be engaged by said article to cause said side walls to grip the article.

U.S. Pat. No. 3,391,760

Inventor: Harry A. Gonser

Issued: Jul. 9, 1968

Disclosed is a wheel lock block for vehicle wheels comprising spaced apart substantially parallel end members, laterally spaced apart side members secured at their respective ends to said respective end members end portions, said members all being of rigid angular form in lateral section and defining a pair of walls diverging downwardly from the apex of the angle thereof and terminating at their bottom edges in a plane for biting and gripping engagement with a supporting surface, the innermost walls of the respective end and side members diverging from their apex portions to provide a substantially continuing support engaging bottom edge of rectangular form, whereby to receive a vehicle wheel segment between and in contact with both end and side member inner walls to support the wheel against accidental lateral and longitudinal displacement while said wheel is disposed within the space defined by said inner walls.

U.S. Pat. No. 3,811,536

Inventor: Freddie J. Haynes

Issued: May 21, 1974

Shown is a chock for aircraft or other vehicles having ground engaging wheels, including a pair of adjustably engaging chock halves defining a generally U-shaped chock. Each of the chock halves is made of a strong, relatively lightweight synthetic resin, and is of generally triangular cross sectional configuration. Each chock half is of L-shaped configuration and includes an arm configured to register with a corresponding arm of the other chock half when the chock halves are slidably engaged. A securing member is provided for locking the two halves of the chock in a selected position when the chock is in position for brakingly engaging the opposite sides of a tire or wheel.

U.S. Pat. No. 4,191,391

Inventor: Peter J. Dorlini

Issued: Mar. 4, 1980

The present invention provides a shopping cart of the two-wheel variety wherein an auxiliary sled attachment is provided, said attachment being adapted to be moved from one to the other of two selectable positions and to be retained in either of such positions, said attachment consisting of a sled having a snow engaging surface which in one position will underlie the wheels, and in the other position will be held out of engagement with the sidewalk or street and in substantially parallel coincidence with a side of the cart.

U.S. Pat. No. 4,856,659

Inventor: Jimmy M. Krebs

Issued: Aug. 15, 1989

There is provided a display apparatus for automobile tires molded as a one piece structure and assembled from two identical members. The tire supporting surface is located on the surface of the legs of each structure. This surface has indentations which protrude on the underside of the surface whereby overlapping legs interlock under the weight of the tire to create a rigid structure supporting the tire in a vertical position.

U.S. Pat. No. 5,036,986

Inventor: Albertus J. Kral, et al.

Issued: Aug. 6, 1991

This invention relates to an improved, low profile, lightweight, durable, expandable bicycle stand, which holds one or more bicycles, having a wide variety of tire sizes, securely in an upright position. The device of the invention provides one or more optionally interlocking, unitary hollow bodies having bicycle wheel retaining slots vertically disposed therethrough, which retaining slots are tapered, at one or both distal ends to accept and hold a resilient tire therebetween. The hollow bodies have a filling means, and can be at least partially filled with fluid and/or particulate material to weight the stand and increase its stability.

U.S. Pat. No. 5,749,475

Inventor: Jimmy M. Krebs

Issued: May 12, 1998

The apparatus of this invention comprises first and second support members, wherein each support member includes horizontally extending legs and an upright portion. One leg of each support member is arranged to overlie a leg of the other support member, and locking tabs on the overlying legs insert and lock into notches of the underlying legs to interlock the supports.

U.S. Pat. No. 6,386,331

Inventor: Ronald L. Scheffer

Issued: May 14, 2002

A method and apparatus for securing a wheeled device such as a shopping cart is disclosed. In one embodiment, the apparatus comprises a body having a bottom surface for engaging a support surface and a top surface defining at least one first stop having a first face and a second face, the first face sloping upwardly from the bottom surface towards the rear face and defining a leading edge positioned near the support surface, an apex provided between the first and second faces, the second face sloping downwardly from the apex, and at least one securing element for securing the cart securing structure to the support surface. In use, the wheels of a cart are rolled over the sloping first face into engagement with the second face. In another embodiment of the invention, the body defines first and second stops having a trough positioned therebetween and the wheels of a cart are rolled over a sloping surface of the first stop into engagement with the trough.

U.S. Pat. No. 6,581,785

Inventor: Thomas Richard Falkenstein

Issued: Jun. 24, 2003

A display apparatus for displaying an article such as a pneumatic tire includes an elongate base with a substantially planar top surface and article support members projecting from said top surface at opposed ends of the base. Opposed side or lateral article support members are also provided each having an elongate side wall for supporting the article and connection means are provided projecting from opposed ends of each of the side article support members for removable and adjustable inner connection with the article support members on the base to provide a display for displaying an article such as a pneumatic tire in a vertical position and with the ability to accommodate different sizes of tires.

U.K. Patent Number GB810,593

Inventor: K. W. Paulus Co.

Issued: Mar. 18, 1959

Vehicle wheels are secured to the wheel tracks of a garage lift (see Group XXX) by chocks and which can be used singly or in combination as shown in FIG. 5. The chocks are provided with hooks adapted to engage selected holes in the tracks, whilst the chocks each have spring arms which move from the position shown in FIG. 4 to that shown in FIG. 5 as a wheel passes over the curved plate 21. In the position shown in FIG. 5 each arm springs away from its associated hole and so prevents reverse movement of the chock. In the modification shown in FIG. 6, each chock comprises a curved plate provided with a rigid leg, and a pair of spring legs which operate similarly to legs.

U.K. Patent Number GB2,281,277

Inventor: Michael John Lister

Issued: Jan. 3, 1995

A wheel-raising device comprises an upwardly concavely curved portion between two ramps portions to accommodate one wheel of a closely coupled pair of wheels of a vehicle. With wheel arranged to sit on the curved portion, the other wheel of the pair remains above and out of contact with the device and thereby the other wheel becomes available for examination and/or repair. Preferably, two or more devices are connected together by pins engaging in transverse holes.

While these stands may be suitable for the purposes for which they were designed, they would not be as suitable for the purposes of the present invention, as hereinafter described.

SUMMARY OF THE PRESENT INVENTION

The present invention discloses a storage stand for a shopping cart and baby stroller which will keep the shopping cart or baby stroller erect and immobile with a pair of adjustable spring-hinged arms having bungee cords positioned on the outside to keep the cart in the folded position. The present invention also has a locking pin that can slide vertically to lock the clamps in an upright position. One distal end of the front arm or clamp comprises a loop member where the bungee cord passes through to the second arm or clamp having a ring positioned at its distal end for connecting the bungee cord hooks thereto. The base forming the housing is comprised of slidably engaging members, one forming a shell for the other to selectively slide into and out at the user's discretion. Each of the sliding members has a cavity forming a wheel well. The present invention provides locking means for the clamping members in the raised position in the form of spring-tensioned pin.

A primary object of the present invention is to provide a stand for a collapsible shopping cart and baby strollers.

Another object of the present invention is to provide a stand having means for retaining spaced apart wheels therein.

Yet another object of the present invention is to provide a stand having fastening means for maintaining shopping cart or baby stroller closure state.

Still yet another object of the present invention is to provide a stand having a housing with spaced apart cavities forming wheel wells.

Another object of the present invention is to provide a stand having hingedly attached arms with bungee fastening means located on the distal ends.

Yet another object of the present invention is to provide a stand wherein said arms keep a closed shopping cart in the closed state until selectively released.

Still yet another object of the present invention is to provide a stand for a shopping cart wherein said housing is formed of first and second members mating in tongue and groove fashion.

Another object of the present invention is to provide a stand wherein each of the first and second housing member each has a wheel well.

Yet another object of the present invention is to provide a stand to accommodate various sized collapsible shopping carts.

Additional objects of the present invention will appear as the description proceeds.

The present invention overcomes the shortcomings of the prior art by providing a storage stand for a shopping cart, which will keep the shopping cart erect and immobile with a pair of hinged arms positioned on the outside to keep the cart in the folded position. The distal ends of the arms have mating members of a fastener to hold the arms in a selective locked position will the article is placed therebetween.

Furthermore, the base forming the housing is comprised of slidably engaging members, one forming a shell for the other to selectively slide into and out at the user's discretion. Each of the sliding members has a cavity forming a wheel well. Adjustment of the distance between the wheel wells provides for various sized shopping carts.

The foregoing and other objects and advantages will appear from the description to follow. In the description reference is made to the accompanying drawings, which forms a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

LIST OF REFERENCE NUMERALS

With regard to reference numerals used, the following numbering is used throughout the drawings.

10 present invention
12 shopping cart
13 baby stroller
14 base
16 wheel wells
18 wheels
19 clamps
20 cord
22 sliding joint
24 hinge
26 lock lever
28 clamp knob
30 ring
32 loop
34 hooks
36 arrows
38 locking mechanism
40 pin
42 pin spring
44 padding

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
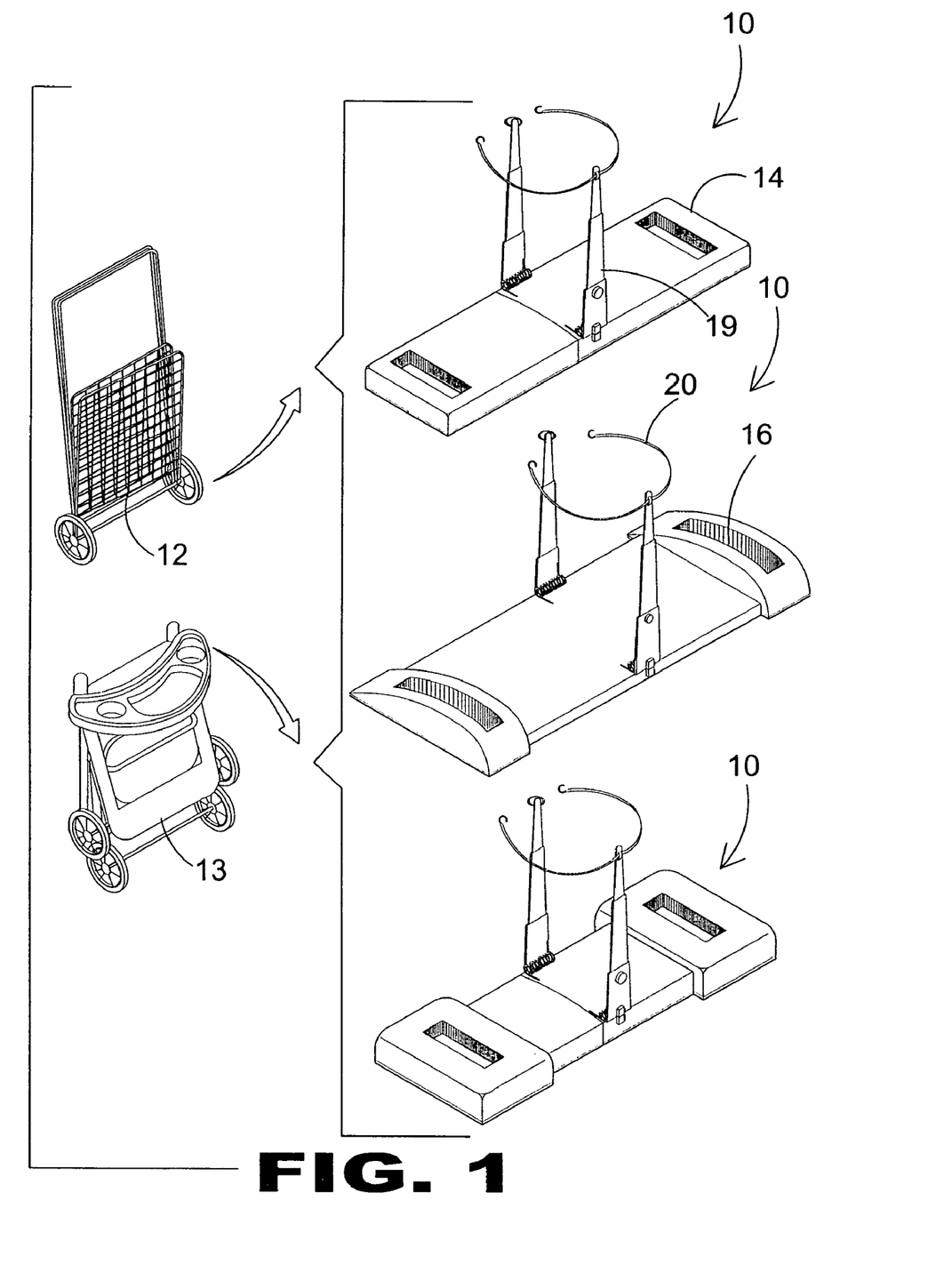
FIG. 1 is an illustrative view of the present inventions variations.

Turning to FIG. 1, shown therein is an illustrative view of the present invention's 10 variations. The present invention 10 being a shopping cart 12 and baby stroller or other wheeled vehicle stand that is made of heavy duty plastic and comes in multiple colors to match the color of the shopping cart. The base 14 is filled with sand and is airtight to keep it steady and anchored to the floor. The device 10 is designed to accommodate large and small shopping carts 12 and strollers by expanding or contracting the housing 14 to fit the width of the cart or stroller. To use, the cart 12 or stroller is folded into its upright position and placed onto the stand. The wheels 18 fit into the wheel wells 16 and the cart or stroller is locked into position by two adjustable clamps 19 that have a bungee cord 20 at the very top to hold the cart 12 or stroller in place. The device of the present invention 10 helps protect floors and tiles by keeping the cart or stroller in an upright, folded position when not in use. This will avoid the potential for falling over and causing damage to walls, floor or even an injury to a child.

Figure 2:
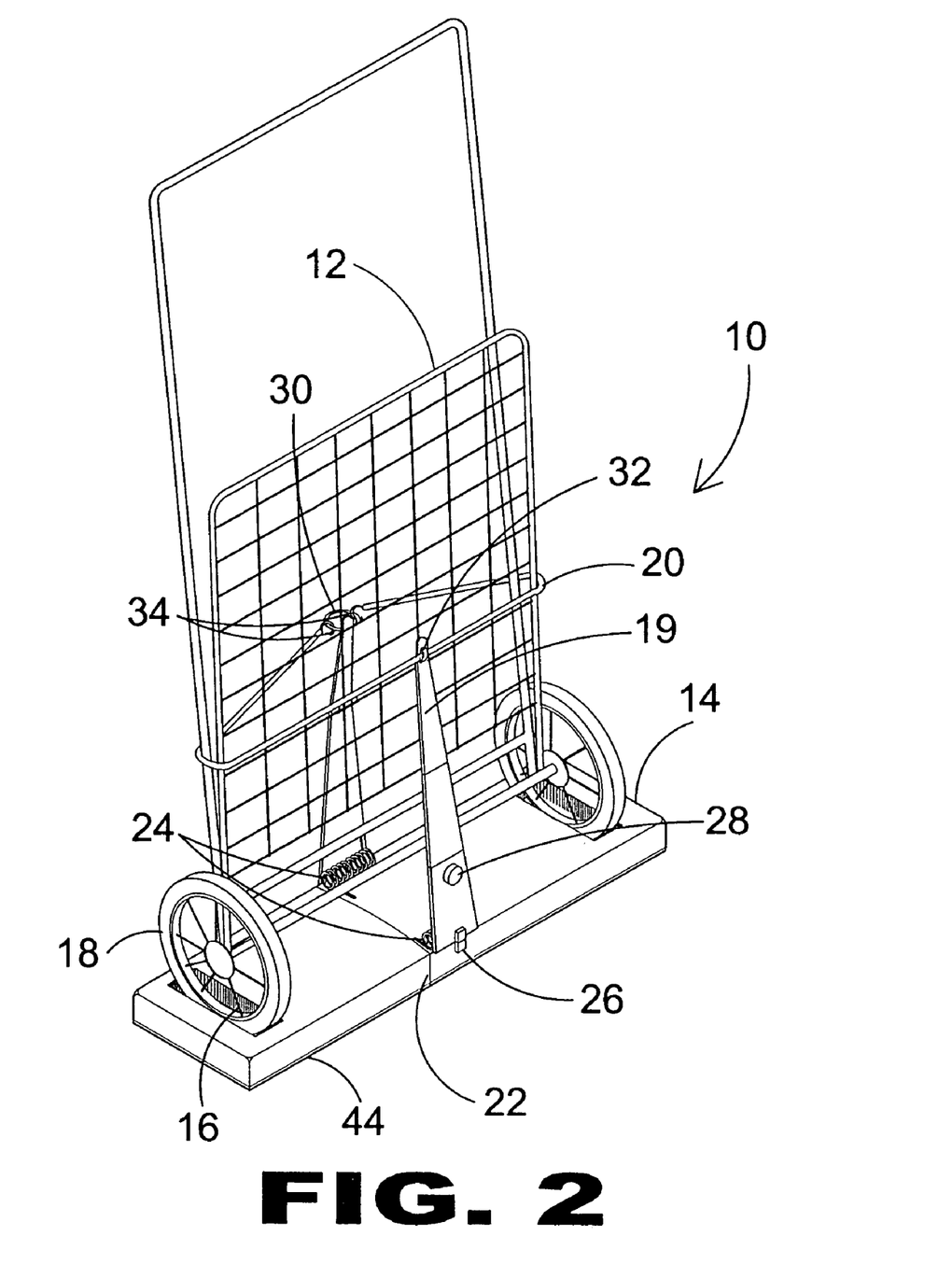
FIG. 2 is a perspective view of the first style of the present inventions.

Turning to FIG. 2, shown therein is a perspective view of the first style of the present invention 10. Shown is the present invention 10 being a shopping cart 12 and baby stroller stand made of heavy duty plastic and comes in multiple colors to match the color of the shopping cart or baby stroller. The base 14 is filled with sand and is airtight to keep it steady and anchored to the floor. The device 10 is designed to accommodate large and small shopping carts 12 by expanding or contracting the housing to fit the width of the cart. To use, the cart 12 is folded into its upright position and placed onto the stand. The wheels 18 fit into the wheel wells 16 and the cart 12 is locked into position by two clamps 18 that have a latch at the very top to hold the cart in place. The clamps 19 can be positioned to lie parallel to the base 14 when not in use. Also shown are rubber padding 44, sliding joint 22, spring hinge 24, lock lever 26, clamp knob 28, ring 30, loop 32, and hooks 34.

Figure 3:
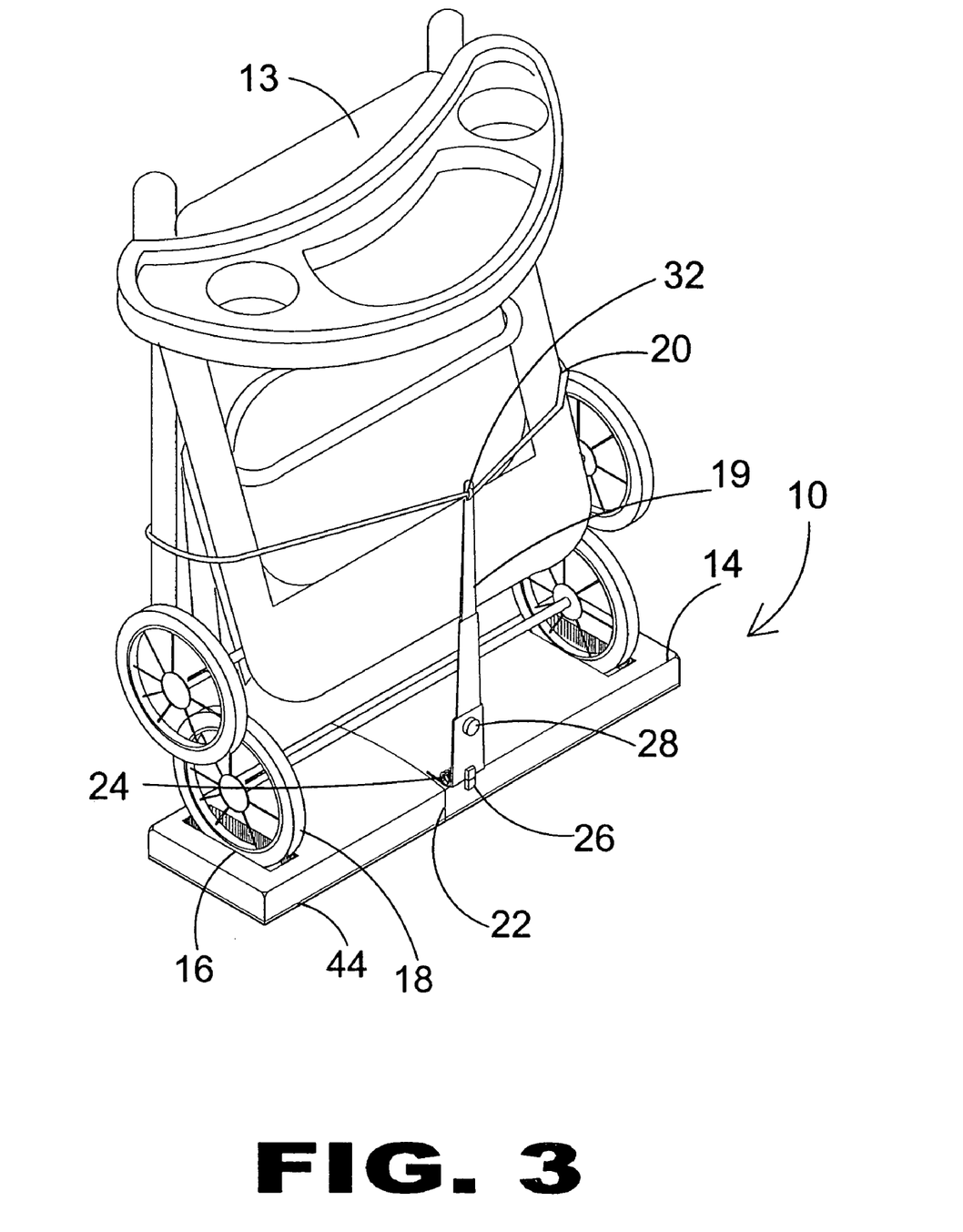
FIG. 3 is a perspective view of the first style of the present inventions.

Turning to FIG. 3, shown therein is a perspective view of the first style of the present invention 10. Shown is the present invention 10 being a shopping cart and baby stroller 13 stand made of heavy duty plastic and comes in multiple colors to match the color of the shopping cart. The base 14 is filled with sand and is airtight to keep it steady and anchored to the floor. The device 10 is designed to accommodate large and small shopping carts by expanding or contracting the housing 14 to fit the width of the cart. To use, the cart 13 is folded into its upright position and placed onto the stand 14. The wheels 18 fit into the wheel wells 16 and the cart 13 is locked into position by two clamps 19 that have a latch at the very top to hold the cart in place. The clamps 19 can be positioned to lie parallel to the base 14 when not in use. Other previously disclosed elements are also shown.

Figure 4:
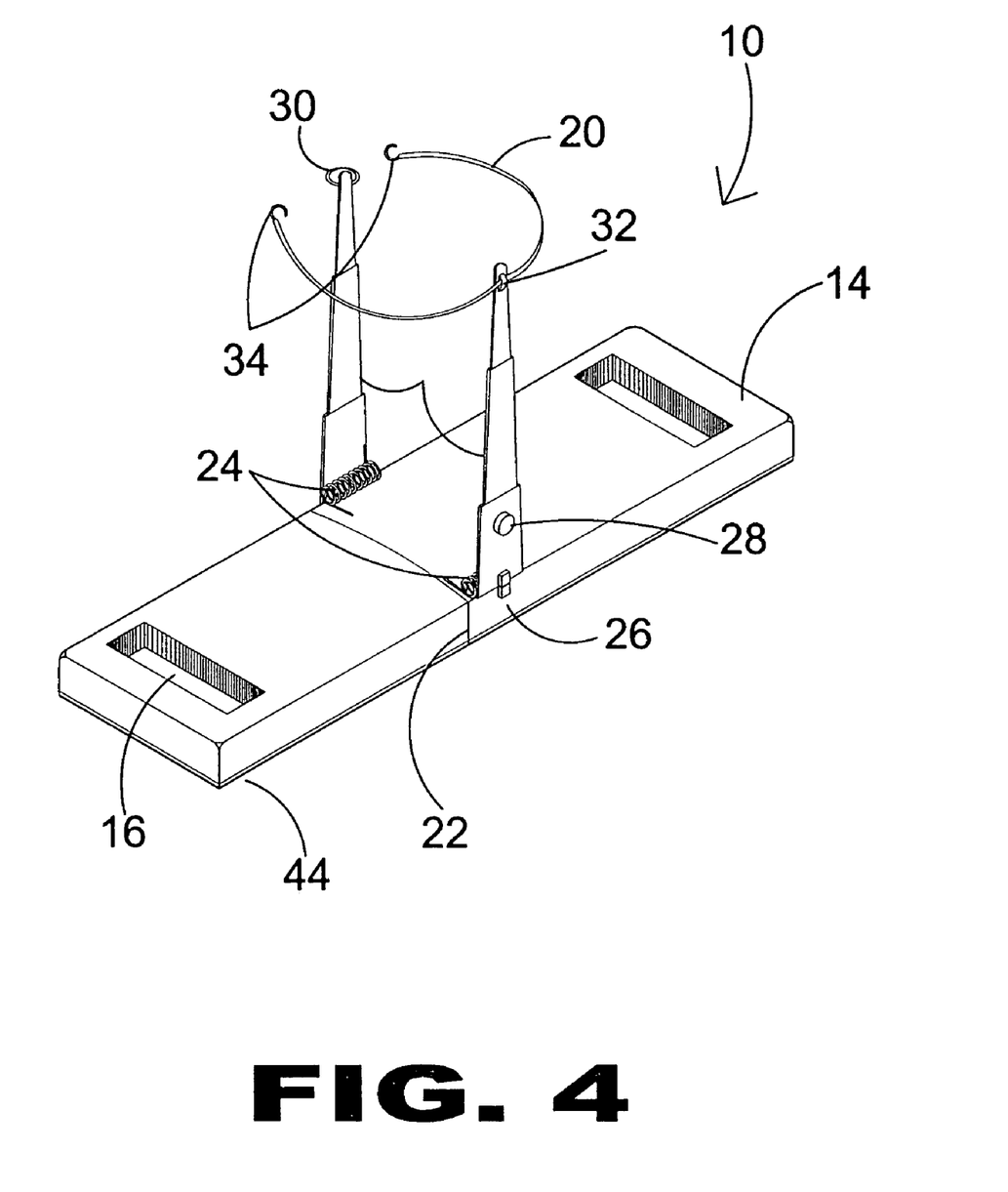
FIG. 4 is a perspective view of the first style of the present inventions.

Turning to FIG. 4, shown therein is a perspective view of the first style of the present invention 10. Shown is the present invention 10 being a shopping cart and baby stroller stand made of heavy duty plastic and comes in multiple colors to match the color of the shopping cart. The base 14 is filled with sand and is airtight to keep it steady and anchored to the floor. The device 10 is designed to accommodate large and small shopping carts by expanding or contracting the housing 14 to fit the width of the cart. To use, the cart is folded into its upright position and placed onto the stand 14. The wheels fit into the wheel wells 16 and the cart is locked into position by two clamps 19 that have a latch with hooks 34 at the very top to hold the cart in place. The clamps 19 can be positioned to lie parallel to the base 14 when not in use. Other previously disclosed elements are also shown.

Figure 5:
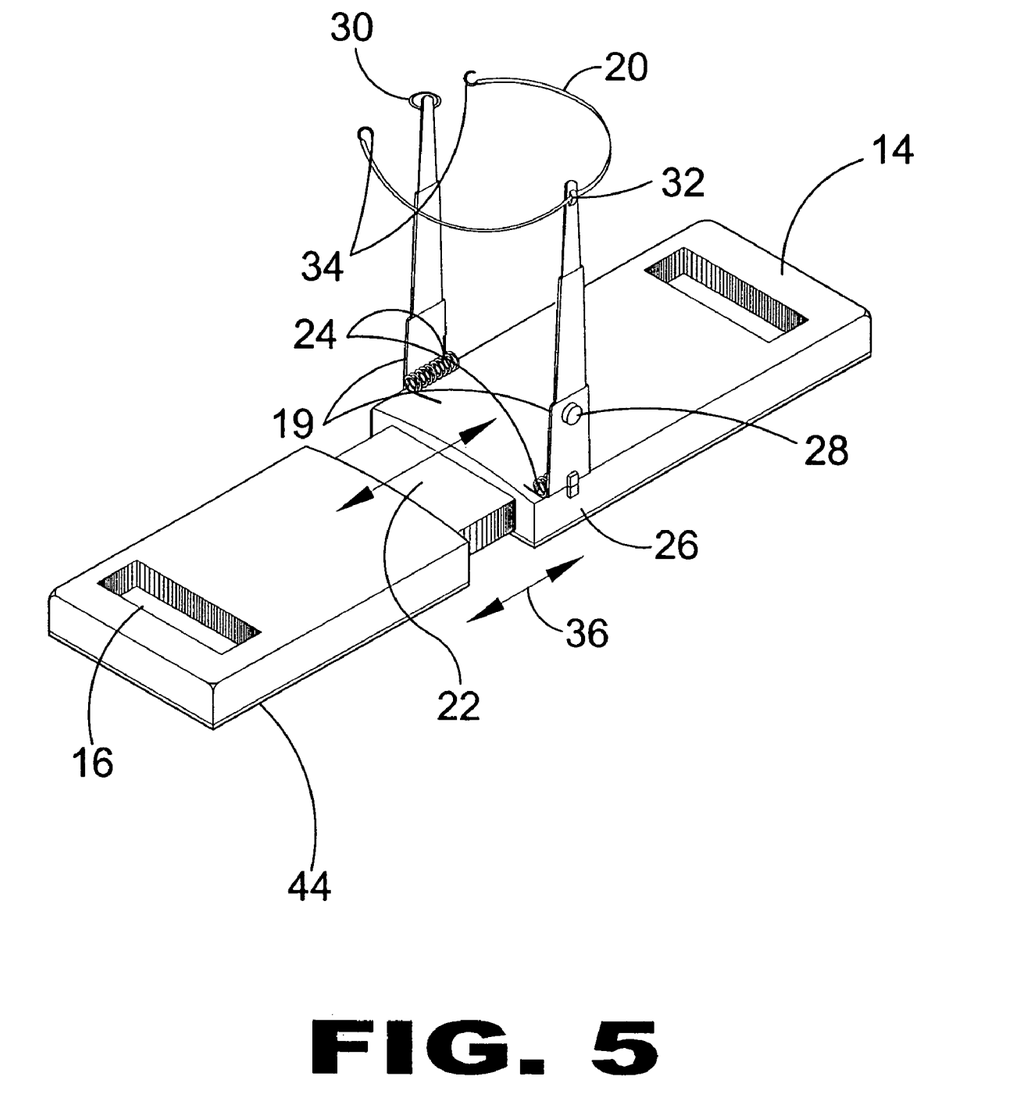
FIG. 5 is a perspective view of the first style of cart stand of the present inventions in an expanded position.

Turning to FIG. 5, shown therein is a perspective view of the first style of cart stand of the present invention 10 in an expanded position at arrows 36. Shown is the present invention 10 being a shopping cart and baby stroller stand that is made of heavy duty plastic and comes in multiple colors to match the color of the shopping cart. The base 14 is filled with sand and is airtight to keep it steady and anchored to the floor. The device 10 is designed to accommodate large and small shopping carts by expanding or contracting the housing 14 to fit the width of the cart. To use, the cart is folded into its upright position and placed onto the stand. The wheels fit into the wheel wells 16 and the cart is locked into position by two clamps 19 that have a latch at the very top to hold the cart in place. The clamps 19 can be positioned to lie parallel to the base 14 when not in use. Other previously disclosed elements are also shown.

Figure 6:
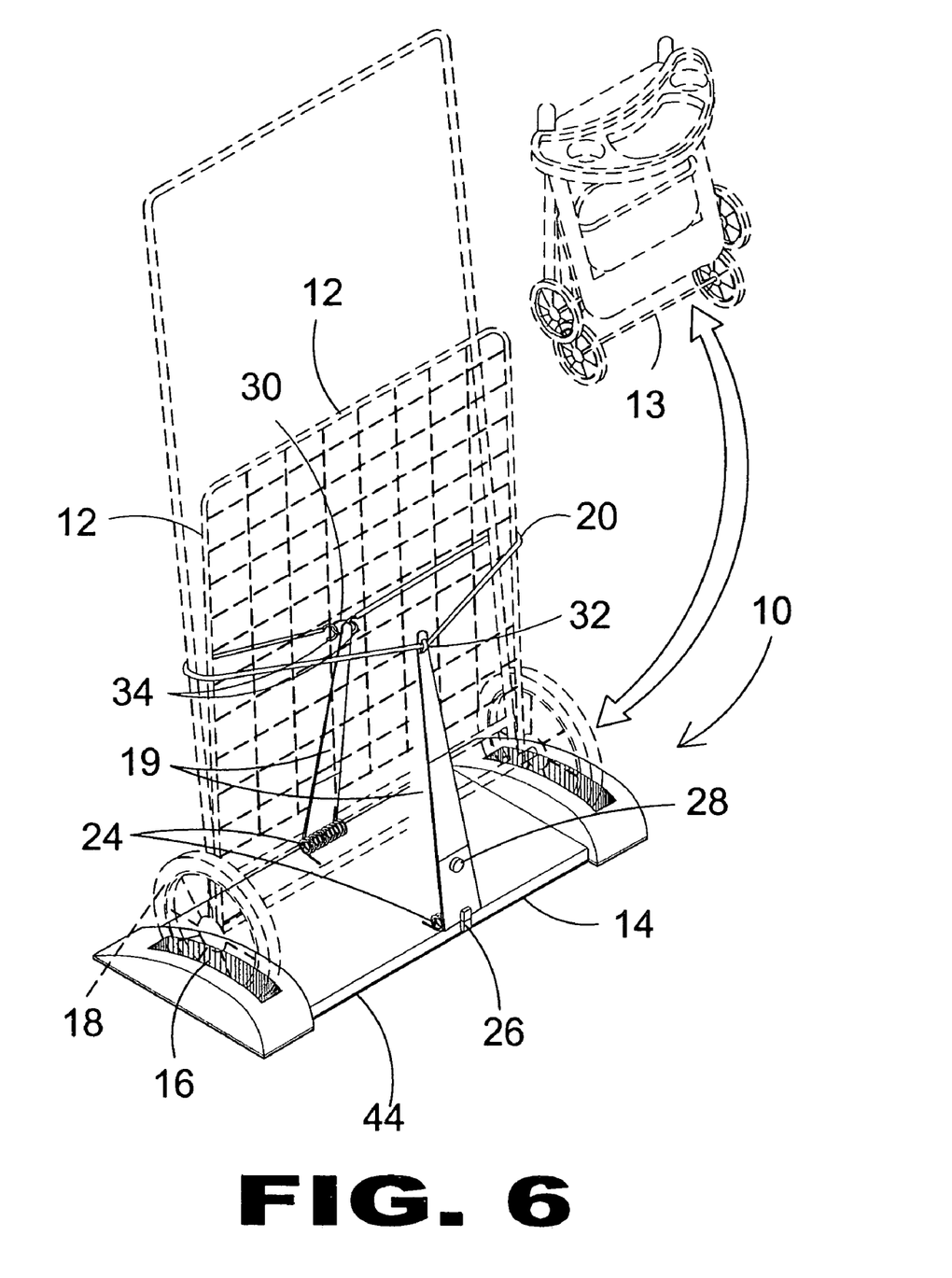
FIG. 6 is a perspective view of the second style cart stand of the present inventions.

Turning to FIG. 6, shown therein is a perspective view of the second style cart stand of the present invention 10. Shown is the present invention 10 being a shopping cart 12 and baby stroller 13 stand that is made of heavy duty plastic and comes in multiple colors to match the color of the shopping cart. The base 14 is filled with sand and is airtight to keep it steady and anchored to the floor. The device 10 is designed to accommodate large and small shopping carts 12 by expanding or contracting the housing 14 to fit the width of the cart. To use, the cart 12 is folded into its upright position and placed onto the stand 14. The wheels 18 fit into the wheel wells 16 and the cart 12 is locked into position by two clamps 19 that have a latch at the very top to hold the cart in place. The clamps 19 can be positioned to lie parallel to the base 14 when not in use. Other previously disclosed elements are also shown.

Figure 7:
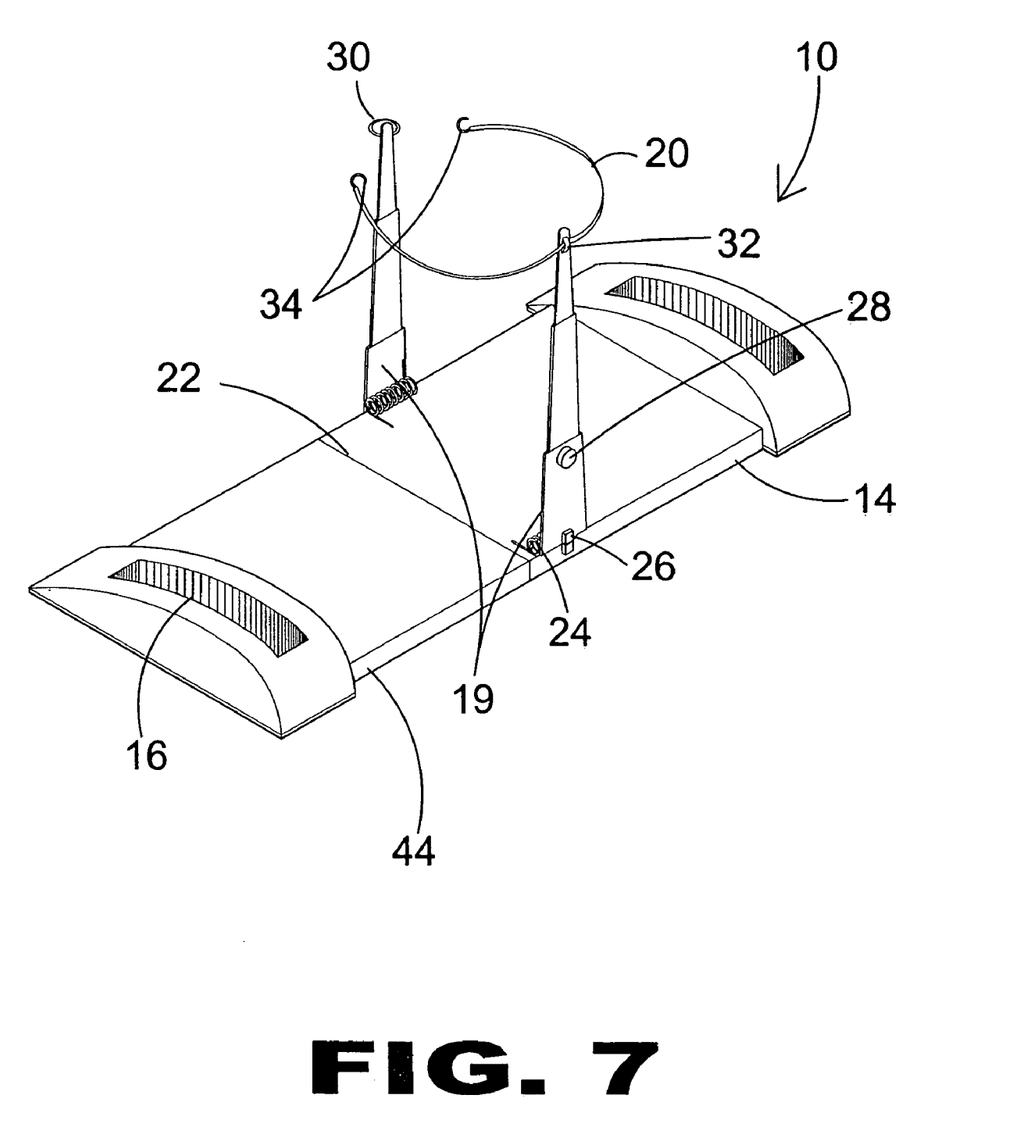
FIG. 7 is a perspective view of the second style cart stand of the present inventions.

Turning to FIG. 7, shown therein is a perspective view of the second style cart stand of the present invention 10. Shown is the present invention 10 being a shopping cart and baby stroller stand is made of heavy duty plastic and comes in multiple colors to match the color of the shopping cart. The base 14 is filled with sand and is airtight to keep it steady and anchored to the floor. The device 10 is designed to accommodate large and small shopping carts by expanding or contracting at 22 the housing 14 to fit the width of the cart. To use, the cart is folded into its upright position and placed onto the stand 14. The wheels fit into the wheel wells 16 and the cart is locked into position by two clamps 19 that have a latch at the very top to hold the cart in place. The clamps 19 can be positioned to lie parallel to the base when not in use. Other previously disclosed elements are also shown.

Figure 8:
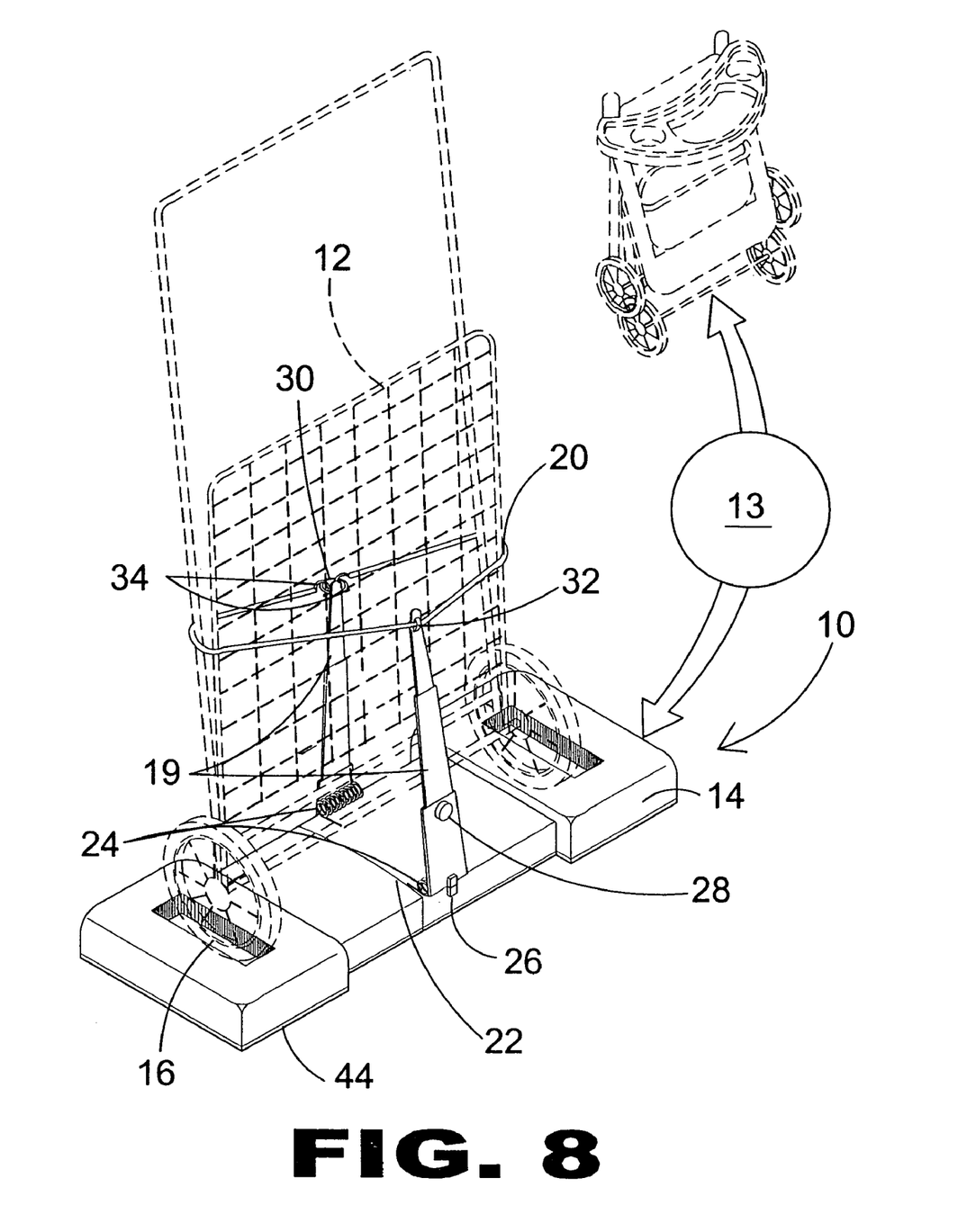
FIG. 8 is a perspective view of the third style cart stand of the present inventions.

Turning to FIG. 8, shown therein is a perspective view of the third style cart stand of the present invention 10. Shown is the present invention 10 being a shopping cart 12 and baby stroller 13 stand is made of heavy duty plastic and comes in multiple colors to match the color of the shopping cart. The base 14 is filled with sand and is airtight to keep it steady and anchored to the floor. The device 10 is designed to accommodate large and small shopping carts 12 by expanding or contracting the housing at 22 to fit the width of the cart. To use, the cart 12 is folded into its upright position and placed onto the stand 14. The wheels fit into the wheel wells 16 and the cart is locked into position by two clamps 19 that have a latch at the very top to hold the cart in place. The clamps 19 can be positioned to lie parallel to the base 14 when not in use.

Figure 9:
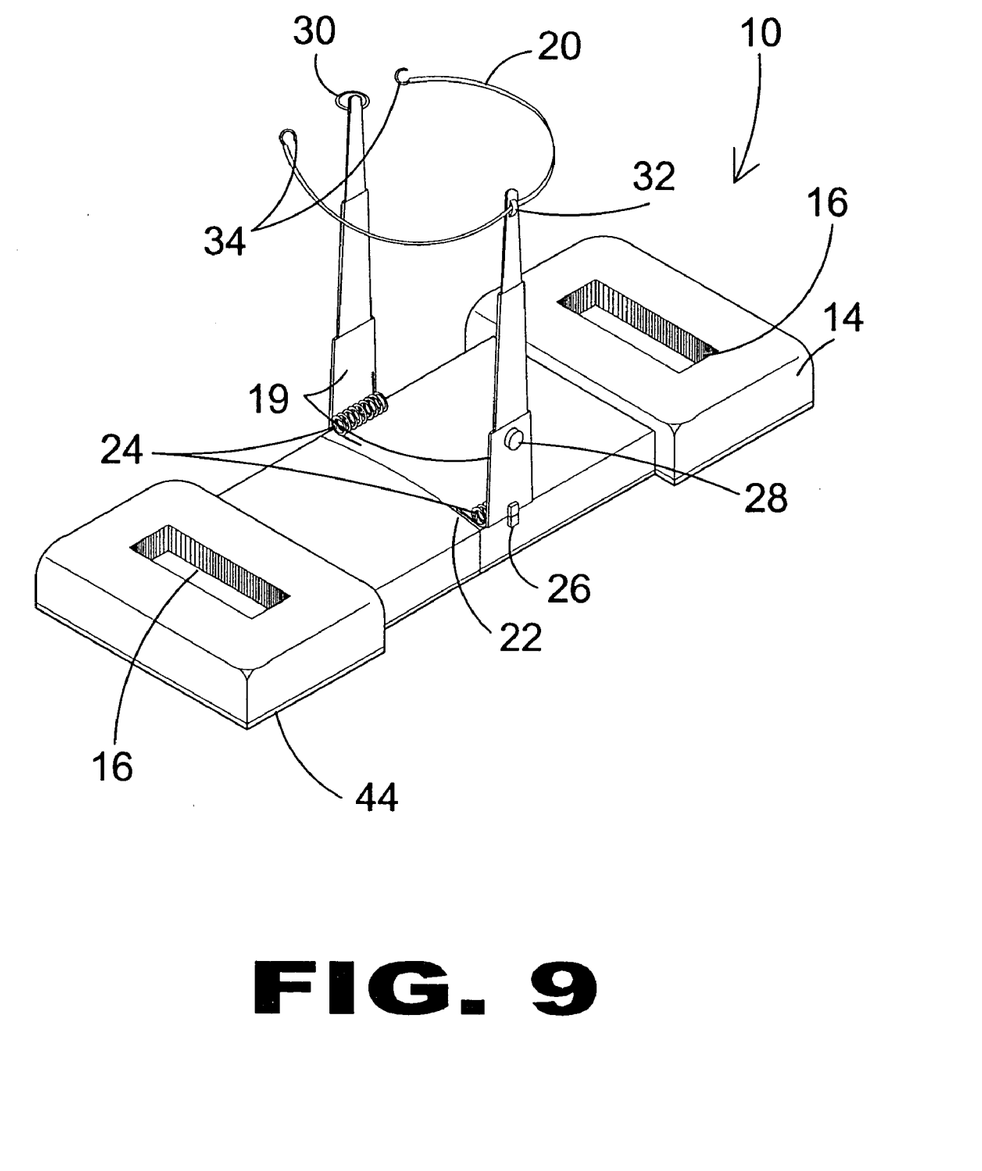
FIG. 9 is a perspective view of the third style cart stand of the present inventions.

Turning to FIG. 9, shown therein is a perspective view of the third style cart stand of the present invention 10. Shown is the present invention 10 being a shopping cart and baby stroller stand is made of heavy duty plastic and comes in multiple colors to match the color of the shopping cart. The base 14 is filled with sand and is airtight to keep it steady and anchored to the floor. The device 10 is designed to accommodate large and small shopping carts by expanding or contracting the housing at 22 to fit the width of the cart. To use, the cart is folded into its upright position and placed onto the stand 14. The wheels fit into the wheel wells 16 and the cart is locked into position by two clamps 19 that have a latch at the very top to hold the cart in place. The clamps 19 can be positioned to lie parallel to the base when not in use. Other previously disclosed elements are also shown.

Figure 10:
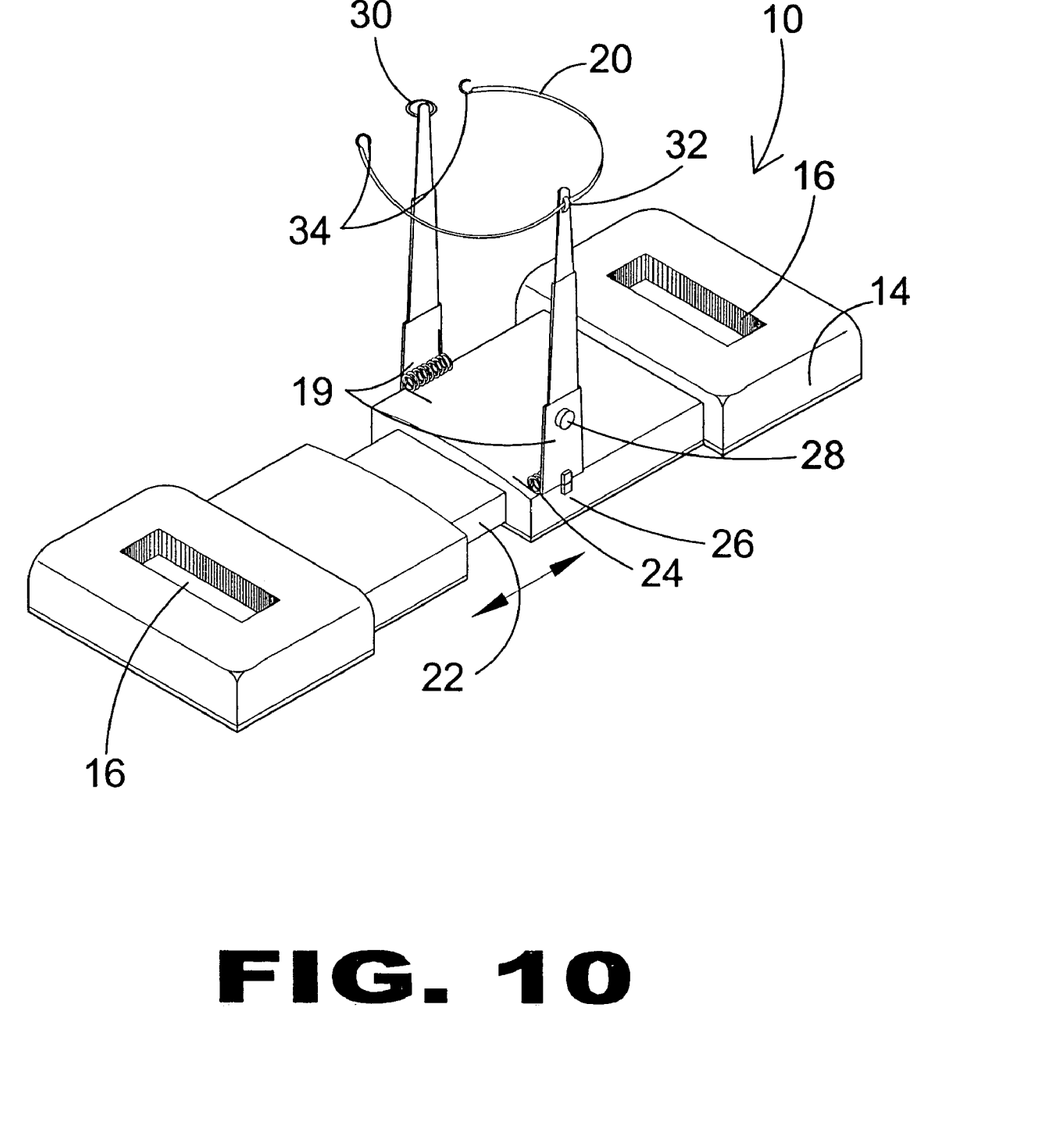
FIG. 10 is a perspective view of the third style cart stand of the present inventions.

Turning to FIG. 10, shown therein is a perspective view of the third style cart stand of the present invention 10. Shown is the present invention 10 being a shopping cart and baby stroller stand that is made of heavy duty plastic and comes in multiple colors to match the color of the shopping cart and baby stroller. The base 14 is filled with sand and is airtight to keep it steady and anchored to the floor. The device 10 is designed to accommodate large and small shopping carts by expanding or contracting at 22 the housing 14 to fit the width of the cart. To use, the cart is folded into its upright position and placed onto the stand 14. The wheels fit into the wheel wells 16 and the cart is locked into position by two clamps 19 that have a latch at the very top to hold the cart in place. The clamps 19 can be positioned to lie parallel to the base 14 when not in use. Other previously disclosed elements are also shown.

Figure 11:
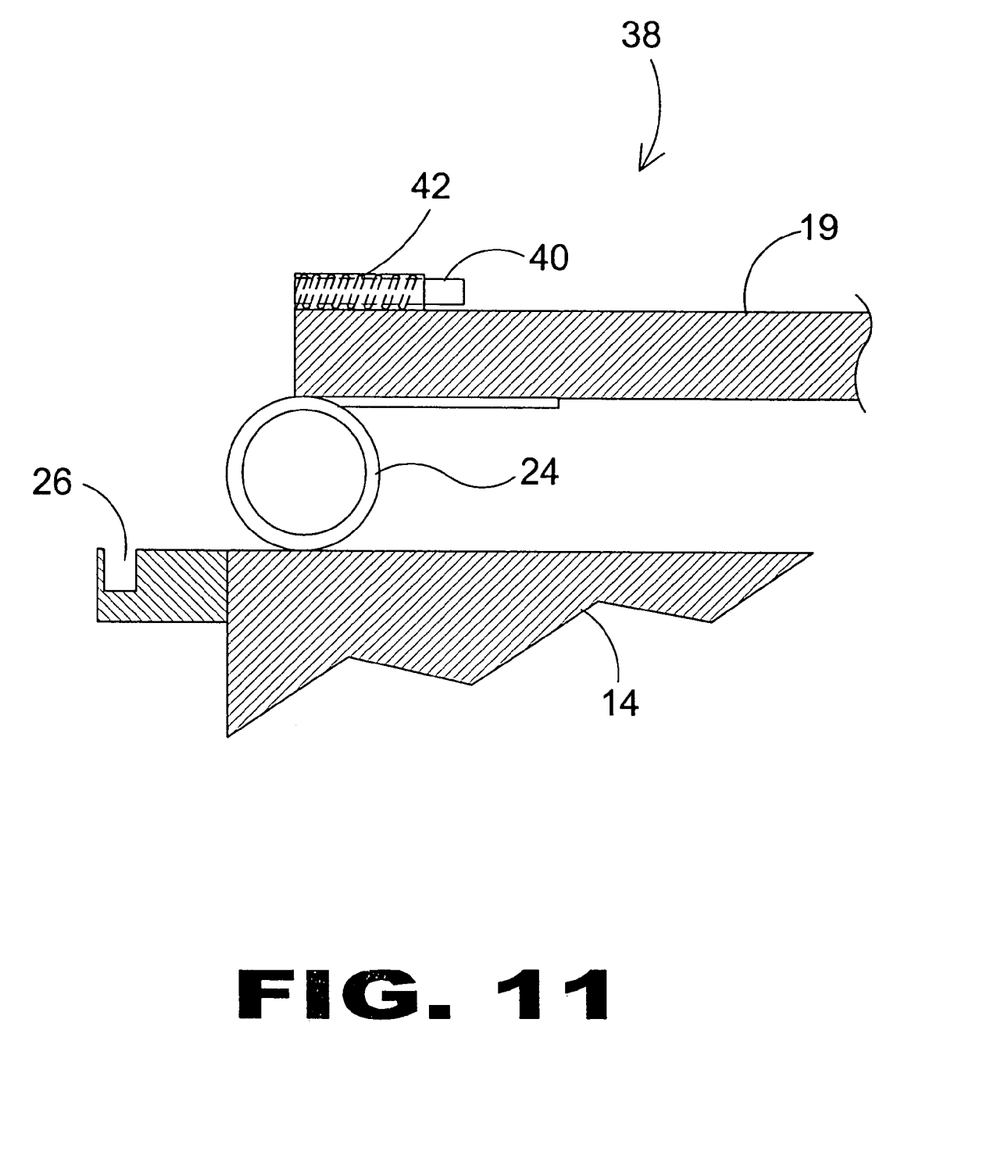
FIG. 11 is a detailed view of the clamp locking mechanism of the present invention in a pre-used position.

Turning to FIG. 11, shown therein is a detailed view of the clamp locking mechanism of the present invention in the pre-used position. Shown is the clamp locking mechanism 38 of the present invention. When the clamp 19 arm is lifted, the locking pin 40 is inserted into its pin receptacle counterpart 26 securing the clamp arm in a upward position. To release, the user simply pushes the top of the clamp arm 19, freeing the pin 40 from its counterpart 26 and allowing the clamp arm to press on the stroller. Also shown are spring hinge 24, pin spring 42 and base 14.

Figure 12:
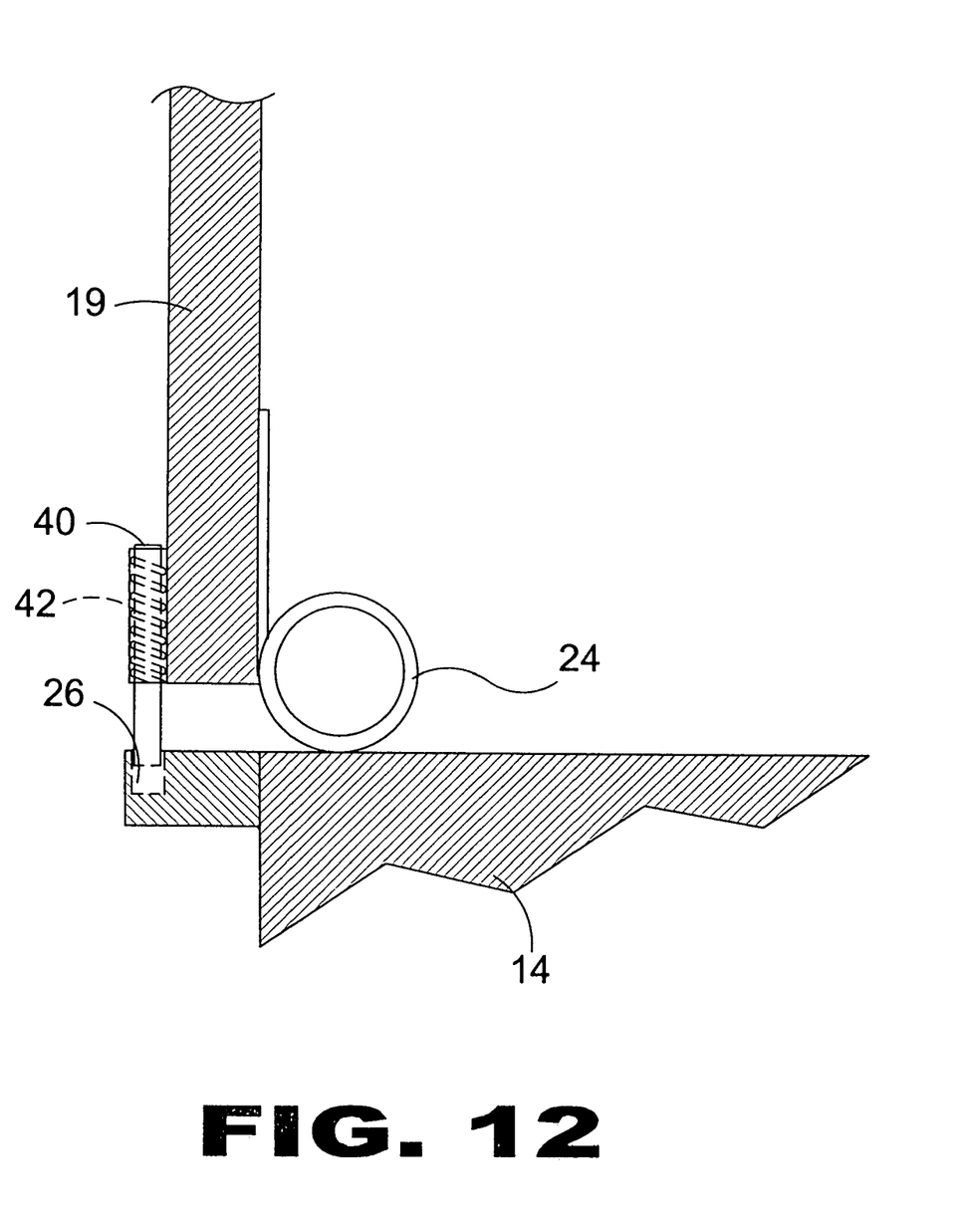
FIG. 12 is a detailed view of the clamp locking mechanism of the present invention in a ready to use position.

Turning to FIG. 12, shown therein is a detailed view of the clamp locking mechanism of the present invention in a ready to use position. Shown is the clamp locking mechanism 38 of the present invention. When the clamp arm 19 is lifted, the pin 40 is inserted into its counterpart 26 securing the clamp arm in an upward position. To release, the user simply pushes the top of the clamp arm 19, freeing the pin 40 from its counterpart 26 and allowing the clamp arm to press on the stroller. Also shown are spring hinge 24, pin spring 42 and base 14.

We claim:

1. An apparatus in combination with a folded wheeled vehicle having at least two wheels in an upright position, comprising:
   a) a base defined by top and bottom surfaces, front and rear ends, and a pair of sides;
   b) a wheel well being disposed in and adjacent each side of said base so that a corresponding wheel of the wheeled vehicle can be placed in each of said wheel wells for removably securing the wheel with said folded wheeled vehicle in an upright position;
   c) means for adjusting the width of said base whereby the distance between the wheel wells can be varied in order to accommodate differently sized wheeled vehicles; and,
   d) means for securing the folded wheeled vehicle on said base comprising first and second straight upright arms each having first and second ends being disposed on said front and rear ends respectively of said base and intermediate said pair of sides, said upright arms extending along opposite sides of said fold wheeled vehicle with the second end of each upright arm being attached to said base and the first end of each upright arm being a free end whereby the folded wheeled vehicle can be removably secured to the base;
   e) said means for adjusting the width of said base resulting in change of distance the wells comprising:
      i) said base having first and second portions, each of said first and second portions having first and second ends, wherein said first ends thereof are oriented toward each other, wherein said first and second portions are slidably connected;
      ii) a female member being disposed on said first end of said first portion; and, iii) a male member being disposed on said first end of said second portion to permit the width of the base to be adjusted; and f) the second end of each upright arm is connected through a hinge to said base, each hinge being spring-loaded to bias said first end of each upright arm inwardly toward said folded wheeled vehicle for maintaining said folded wheeled vehicle in the upright position.

2. The apparatus of claim 1, further comprising means for locking said first and second arms in an upright position whereby the first and second arms can be placed in a first upright position and then placed in a second downwardly folded position.

3. The apparatus of claim 2, wherein said means for locking said first and second arms in an upright position comprises a locking mechanism being disposed on said second end of each of said first and second arms so that said first and second arms can be placed in a first upright position and then placed in a second downwardly folded position.

4. The apparatus of claim 3, wherein said locking mechanism comprises a spring-loaded pin being downwardly disposed on said second ends of each of said first and second arms, on an outer surface of each arm, wherein each said pin has a first and second end, pin receptacles being disposed on ends of said base adjacent said second ends of each of said first and second arms wherein each said pin receptacle receives said first end of said pin so as to lock said first and second arms in said upright position.

5. The apparatus of claim 4, further comprising an attachment member being disposed on said first end of each of said first and second arms and a bungee cord wrapped around the folded wheeled vide disposed on the base, ends of the bungee cord being attached to each other and connected to each of the attachment members to permit the folded wheeled vehicle to be secured to the apparatus.

6. The apparatus of claim 5, wherein the attachment member is a loop on said first end of said first arm and a ring on said first end of said second arm so that the bungee cord having hooks on each end thereof can be passed through said loop and have said books on each end of said bungee cord attach to said ring to permit the folded wheeled vehicle to be secured to the apparatus.

7. The apparatus of claim 6, further comprising a rubber pad being disposed on said bottom of said base to prevent the base from sliding on a floor.

8. The apparatus of claim 7, wherein each of said sides of said base adjacent said wheel wells are enlarged to permit the area of the base near the wheel well to be structurally strengthened.

* * * * *